(12) United States Patent
Yau et al.

(10) Patent No.: US 10,379,833 B2
(45) Date of Patent: Aug. 13, 2019

(54) METHOD AND APPARATUS FOR INSTALLATION OF TRUSTED APPLICATION IN ELECTRONIC DEVICE

(71) Applicant: SAMSUNG ELECTRONICS CO., LTD., Suwon-si (KR)

(72) Inventors: Arnold Yau, Surrey (GB); Chan-kyu Han, Seoul (KR); Sada Sunkesula, Middlesex (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/760,457

(22) PCT Filed: May 20, 2016

(86) PCT No.: PCT/KR2016/005388
§ 371 (c)(1),
(2) Date: Mar. 15, 2018

(87) PCT Pub. No.: WO2017/047904
PCT Pub. Date: Mar. 23, 2017

(65) Prior Publication Data
US 2018/0260202 A1 Sep. 13, 2018

(30) Foreign Application Priority Data

Sep. 15, 2015 (GB) .................................. 1516326.4
May 11, 2016 (KR) ....................... 10-2016-0057812

(51) Int. Cl.
*G06F 9/445* (2018.01)
*G06F 8/61* (2018.01)
(Continued)

(52) U.S. Cl.
CPC ................. *G06F 8/61* (2013.01); *G06F 1/16* (2013.01); *G06F 9/445* (2013.01); *G06F 21/51* (2013.01);
(Continued)

(58) Field of Classification Search
CPC ..... G06F 8/61; G06F 8/60; G06F 8/62; G06F 8/63; G06F 8/64; G06F 8/65; G06F 8/658
(Continued)

(56) References Cited

U.S. PATENT DOCUMENTS 6,353,926 B1 *  3/2002 Parthesarathy ........... G06F 8/65
                                                707/999.202
6,681,391 B1 *  1/2004 Marino ..................... G06F 8/61
                                                711/133

(Continued)

FOREIGN PATENT DOCUMENTS

KR   10-2011-0032246 A   3/2011
KR   10-2015-0032906 A   3/2015
(Continued)

OTHER PUBLICATIONS

Barrera et al, "Understanding and Improving App Installation Security Mechanisms through Empirical Analysis of Android", ACM, pp. 81-92, 2012 (Year: 2012).*

(Continued)

*Primary Examiner* — Anil Khatri
(74) *Attorney, Agent, or Firm* — Sughrue Mion, PLLC

(57) ABSTRACT

An electronic device has a network interface configured to obtain a first application package for installing an application, the first application package having a flag, a normal application and a plurality of trusted applications (TAs), the flag indicating whether the first application package has a trusted application (TA), and a processor configured to identify whether the first application package has a first TA
(Continued)

installable in the electronic device based on the flag included in the first application package and to install the first TA in the electronic device when the first application package has the first TA. The processor is further configured to identify whether the first application package has a second TA installable in another electronic device and control the network interface to transmit the second TA to the other electronic device when the first application package has the second TA installable in the other electronic device.

9 Claims, 7 Drawing Sheets

(51) Int. Cl.
    *G06F 21/51*     (2013.01)
    *G06F 21/53*     (2013.01)
    *G06F 21/57*     (2013.01)
    *G06F 1/16*     (2006.01)
    *H04L 29/08*     (2006.01)

(52) U.S. Cl.
    CPC .............. *G06F 21/53* (2013.01); *G06F 21/57* (2013.01); *H04L 67/34* (2013.01); *H04L 67/10* (2013.01)

(58) Field of Classification Search
    USPC .................................................. 717/168–178
    See application file for complete search history.

(56) References Cited

U.S. PATENT DOCUMENTS

| | | | | |
|---|---|---|---|---|
| 6,854,016 | B1* | 2/2005 | Kraenzel | G06Q 10/06 709/229 |
| 7,290,258 | B2* | 10/2007 | Steeb | G06F 8/60 717/168 |
| 7,337,330 | B2* | 2/2008 | Gatto | G07F 17/32 463/1 |
| 7,350,204 | B2* | 3/2008 | Lambert | G06F 21/51 717/172 |
| 7,624,394 | B1* | 11/2009 | Christopher, Jr. | G06F 8/61 717/174 |
| 8,006,243 | B2* | 8/2011 | Lum | H04L 67/34 717/172 |
| 8,391,837 | B2* | 3/2013 | Corda | G06Q 20/3278 379/189 |
| 8,468,518 | B2* | 6/2013 | Wipfel | G06F 8/61 717/168 |
| 8,505,056 | B2* | 8/2013 | Cannistraro | H04L 12/2809 725/81 |
| 8,752,044 | B2* | 6/2014 | Motta | G06F 8/65 717/174 |
| 8,832,681 | B1 | 9/2014 | Cantrell | |
| 8,869,142 | B2* | 10/2014 | Gouge | G06F 21/51 717/169 |
| 8,887,144 | B1* | 11/2014 | Marr | G06F 8/65 717/168 |
| 8,914,794 | B2* | 12/2014 | Bliss | G06F 8/63 717/101 |
| 8,938,735 | B2* | 1/2015 | Jimmerson | G06F 8/61 717/174 |
| 9,100,172 | B2* | 8/2015 | Kim | H04L 67/34 |
| 9,298,519 | B2 | 3/2016 | Kim | |
| 9,442,709 | B1* | 9/2016 | Delker | G06F 8/61 |
| 9,569,184 | B2 | 2/2017 | Tejani et al. | |
| 9,871,821 | B2* | 1/2018 | Ponsini | H04L 9/3234 |
| 2004/0176068 | A1 | 9/2004 | Paatero | |
| 2012/0304310 | A1 | 11/2012 | Blaisdell | |
| 2012/0331550 | A1 | 12/2012 | Raj et al. | |
| 2013/0160147 | A1 | 6/2013 | Draluk et al. | |
| 2014/0173761 | A1 | 6/2014 | Hong et al. | |
| 2014/0245013 | A1 | 8/2014 | Kim et al. | |
| 2014/0359601 | A1 | 12/2014 | Constable et al. | |
| 2015/0193216 | A1 | 7/2015 | Li et al. | |

FOREIGN PATENT DOCUMENTS

| | | | |
|---|---|---|---|
| KR | 10-2015-0052068 A | | 5/2015 |
| WO | 2013/065915 A1 | | 5/2013 |

OTHER PUBLICATIONS

Heiner et al, "Secure Software Installation in a Mobile Environment", ACM, pp. 155-156, 2007 (Year: 2007).*
Dietrich et al, "Towards Customizable, Application Specific Mobile Trusted Modules", ACM, pp. 31-40 (Year: 2010).*
Barrera et al, "Understanding and Improving App Installation Security Mechanisms through Empirical Analysis of Android", ACM, pp. 81-92 (Year: 2012).*
Belguidoum et al, Analysis of deployment dependencies in software components, ACM, 735-736 (Year: 2006).*
Jun-Jun et al, "A Secure Software Download Framework Based on Mobile Trusted Computing", IEEE, pp. 171-176 (Year: 2009).*
International Search Report (PCT/ISA/210) and Written Opinion (PCT/ISA/237) dated Aug. 24, 2016 issued by the International Searching Authority in International Application No. PCT/KR2016/005388.
Communication dated Mar. 31, 2016, issued by the United Kingdom Patent Office in counterpart United Kingdom application No. 1516326.4.
Communication dated Jun. 7, 2018, issued by the European Patent Office in counterpart European Application No. 16846726.4.
Communication dated Jul. 3, 2019, issued by the European Patent Office in counterpart European Patent Application No. 16846726.4.

* cited by examiner

METHOD AND APPARATUS FOR INSTALLATION OF TRUSTED APPLICATION IN ELECTRONIC DEVICE

TECHNICAL FIELD

The present disclosure relates to a method and apparatus for installing a trusted application (TA) in an electronic device.

BACKGROUND ART

A typical mobile application or app is executed based on a mobile operating system (OS). Applications being executed are isolated from each other by a kernel of the OS, and thus the security of the application may be guaranteed to some extent. However, the security of the application is dependent on the OS that may become contaminated by malware. Thus, an application dealing with sensitive and personal data needs a higher security level.

A trusted application (TA) is an application that provides a security service to an application executed on a normal OS, like a mobile banking application. An application improves its security level by using the TA.

TAs may be distributed to client devices and managed through a server-based system called a trusted services manager (TSM). However, server-based systems like the TSM need a long time to arrange and are expensive to set up, and causes increased management overhead. Therefore, there is a need for a more convenient mechanism for distributing and managing TAs.

DETAILED DESCRIPTION OF THE INVENTION

Technical Solution

The present disclosure relates to a method of installing a trusted application (TA) in an electronic device, and more particularly, to a method of installing a TA in an electronic device by using an existing method of distributing and installing an application.

Advantageous Effects of the Invention

According to an embodiment, without a need for a server-based system for distributing a trusted application (TA) to one or more electronic devices, the TA may be distributed to the one or more electronic devices by using an application package.

BEST MODE

Figure 1:
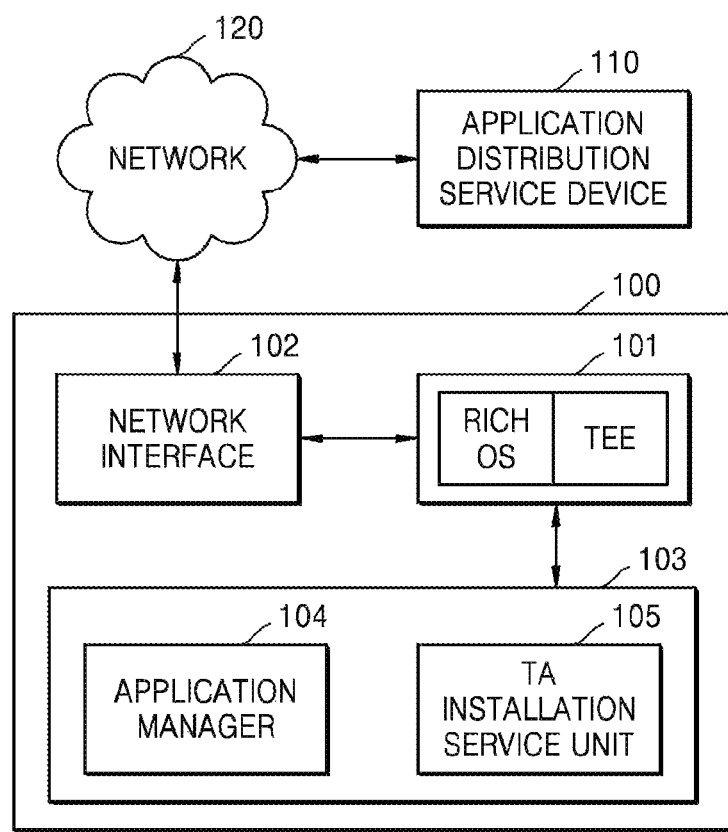
FIG. 1 is a block diagram of a system for distributing a trusted application (TA) according to an embodiment.

A method of installing an application in an electronic device according to an embodiment includes obtaining an application package for installing the application, determining whether the application package includes a trusted application (TA) that is installable in the electronic device, and installing the TA in the electronic device when the application package includes the TA.

The installing of the TA may include selecting a TA that is installable in a security region of the electronic device based on a type of the electronic device, when the application package includes a plurality of TAs corresponding to different types of security regions, and installing the selected TA in the security region of the electronic device.

The method may further include determining whether the application package includes a TA that is installable in another electronic device and transmitting the TA to the other electronic device when the application package includes the TA that is installable in the other electronic device.

The method may further include extracting, from the application package, a second application package that is installable in the other electronic device and transmitting the extracted second application package to the other electronic device.

The other electronic device may include a wearable electronic device that is paired with the electronic device.

The determining may include obtaining a flag indicating whether the TA is included from the application package and determining, based on the obtained flag, whether the application package includes a TA that is installable in the electronic device.

An electronic device in which an application is to be installed according to an embodiment includes a network interface configured to obtain an application package for installing the application and a processor configured to determine whether the application package includes a TA that is installable in the electronic device and to install the TA in the electronic device when the application package includes the TA.

A method of distributing an application to an electronic device according to an embodiment includes obtaining a normal application to be installed in the electronic device and a TA to be installed in a security region of the electronic device, combining the normal application and the TA into an application package, and transmitting the application package to the electronic device.

In an embodiment, a computer-readable recording medium is also provided, which has recorded thereon a program for implementing the method of installing an application in an electronic device.

MODE OF THE INVENTION

Hereinafter, embodiments of the present disclosure will be described in detail with reference to the attached drawings to allow those of ordinary skill in the art to easily carry out the embodiments. However, the present disclosure may be implemented in various forms, and are not limited to the embodiments described herein. To clearly describe the present disclosure, parts that are not associated with the description have been omitted from the drawings, and throughout the specification, identical reference numerals refer to identical parts.

Although terms used in the present disclosure are selected with general terms popularly used at present under the consideration of functions in the present disclosure, the terms may vary according to the intention of those of ordinary skill in the art, judicial precedents, or introduction of new technology. Thus, the terms used in the present disclosure should be defined not by the simple names of the terms but by the meaning of the terms and the contents throughout the present disclosure.

Terms such as first, second, and the like may be used to describe various elements, but the elements should not be limited to those terms. These terms may be used for the purpose of distinguishing one element from another element.

The terms used in the present disclosure are for the purpose of describing particular exemplary embodiments only and are not intended to limit the present disclosure. The singular forms are intended to include the plural forms as well, unless the context clearly indicates otherwise. When it is assumed that a certain part includes a certain component, the term 'including' means that a corresponding component may further include other components unless a specific meaning opposed to the corresponding component is written. In the present specification, especially, in the claims, the use of "the" and other demonstratives similar thereto may correspond to both a singular form and a plural form. Unless the order of operations of a method according to the present disclosure is explicitly mentioned or described otherwise, the operations may be performed in a proper order. The present disclosure is not limited by the order the operations are mentioned.

The phrase used in various parts of the present specification, such as "in some embodiments" or "in an embodiment" does not necessarily indicate the same embodiment.

Some embodiments of the present disclosure may be represented by block components and various process operations. All or some of such functional blocks may be implemented by various numbers of hardware and/or software components which perform specific functions. For example, functional blocks of the present disclosure may be implemented with one or more microprocessors or circuit elements for a specific function. The functional blocks of the present disclosure may also be implemented with various programming or scripting languages. Functional blocks may be implemented as an algorithm executed in one or more processors. Furthermore, the present disclosure may employ any number of conventional techniques for electronics configuration, signal processing and/or control, data processing and the like. The term "mechanism", "element", "means", or "component" is used broadly and is not limited to mechanical or physical elements.

Connecting lines or connecting members between elements shown in the drawings are intended to merely illustrate functional connections and/or physical or circuit connections. In an actual device, connections between elements may be indicated by replaceable or added various functional connections, physical connections, or circuit connections.

Hereinafter, the present disclosure will be described with reference to the accompanying drawings.

FIG. 1 is a block diagram of a system for distributing a trusted application (TA) according to an embodiment.

Referring to FIG. 1, a system for distributing a TA may include an electronic device 100, an application distribution service device 110, and a network 120.

The application distribution service device 110 transmits an application package for installing an application in an electronic device to at least one electronic device 100 through the network 120. The application distribution service device 110 transmits the application package to the electronic device 100 at the request of the electronic device 100.

Figure 2:
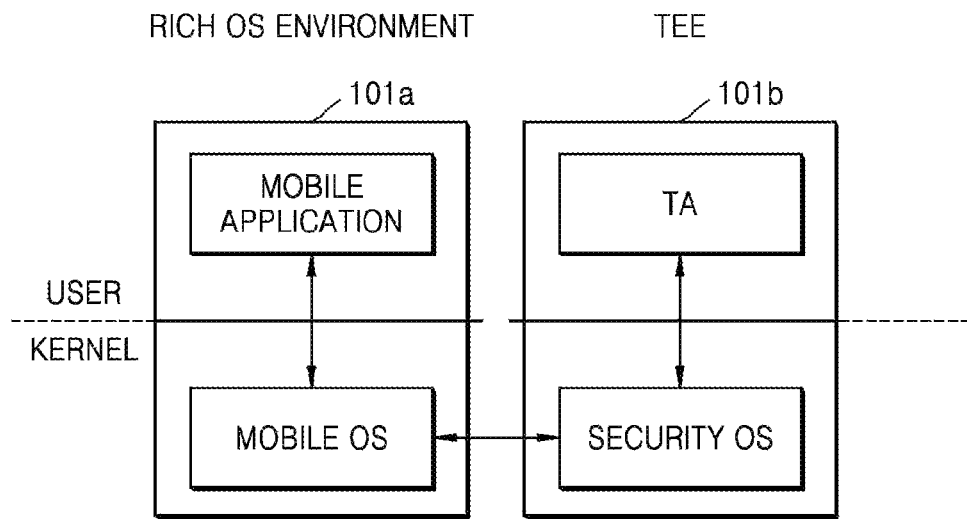
FIG. 2 is a block diagram showing an internal structure of a processor in which a TA is installed, according to an embodiment.

The electronic device 100 may include a processor 101, a network interface 102 for accessing the network 120, and a memory 103 for storing a computer program executable by the processor 101. The processor 101 may include at least one of a rich operating system (OS) environment 101a and a trusted execution environment (TEE) 101b that are shown in FIG. 2. The rich OS environment 101a and the TEE 101b may provide environments where a normal application and a TA may be executed. Hereinbelow, an application installed in the rich OS environment 101a will be referred to as the normal application.

The memory 103 may include a computer-readable recording medium. The memory 103 of the electronic device 100 may include an application manager 104 and a TA installation service unit 105. In an embodiment, the application manager 104 and the TA installation service unit 105 may be software programs stored in the memory 103. The application manager 104 and the TA installation service unit 105 may be embedded in the electronic device 100.

The application manager 104 obtains an application package from the application distribution service unit 110. The application package may include the normal application installed in the rich OS environment 101a.

The TA installation service unit 105 checks when the application package obtained from the application distribution service device 110 includes a TA. When the application package includes a TA, the TA installation service unit 105 extracts the TA from the application package and installs the TA in the TEE 101b.

The TA installation service unit 105 may be provided in advance in the electronic device 100 by a manufacturer of the electronic device 100. Thus, the TA installation service unit 105 may be provided in the electronic device 100 to adapt to an architecture of the TEE 101b. The TA installation service unit 105 extracts the TA from the application package and installs the TA. Thus, according to an embodiment, a separate server-based system for distributing and managing the TA to the plurality of electronic devices 100 may not be needed.

FIG. 2 is a block diagram showing an internal structure of the processor 101 in which a TA is installed, according to an embodiment.

Referring to FIG. 2, the processor 101 of the electronic device 100 may include at least one of the rich OS environment 101a and the TEE 101b where a normal application and a TA may be installed and executed, respectively.

In the rich OS environment 101a, a normal application is executed on an OS. The rich OS environment 101a may include an OS where conventional normal applications of the electronic device 100 may be executed. The normal applications executed in the rich OS environment 101a may be isolated from each other by the OS and executed. Thus, the normal applications may be protected against an external attack. However, the OS of the rich OS environment 101a has a relatively low security level and thus may be contaminated by malware. An application's security level is dependent on an underlying OS, and thus when the OS of the rich OS environment 101a is contaminated, a normal application is also highly likely to be contaminated. Thus, in the rich OS environment 101a, processes that deal with security-non-critical data may be executed by the normal application.

In the TEE 101b, a TA may be executed on the security OS. The security OS may further include an additional security function and strongly control an external access to the TEE 101b. The TEE 101b includes the security OS, thereby providing an isolated environment where the TA is executable.

The rich OS environment 101a and the TEE 101b may be isolated OS environments that are executed in parallel. A data flow between the rich OS environment 101a and the TEE 101b is strictly controlled to protect data of the TEE 101b. In comparison to the rich OS environment 101a, an external access to the TEE 101b is strongly restricted to protect data processed in the TEE 101b.

The TA is called and executed by one or more normal applications operating in the OS of the rich OS environment 101a. For example, a mobile banking application may access the TA to request processing of sensitive and critical data, e.g., user's private information.

Figure 3:
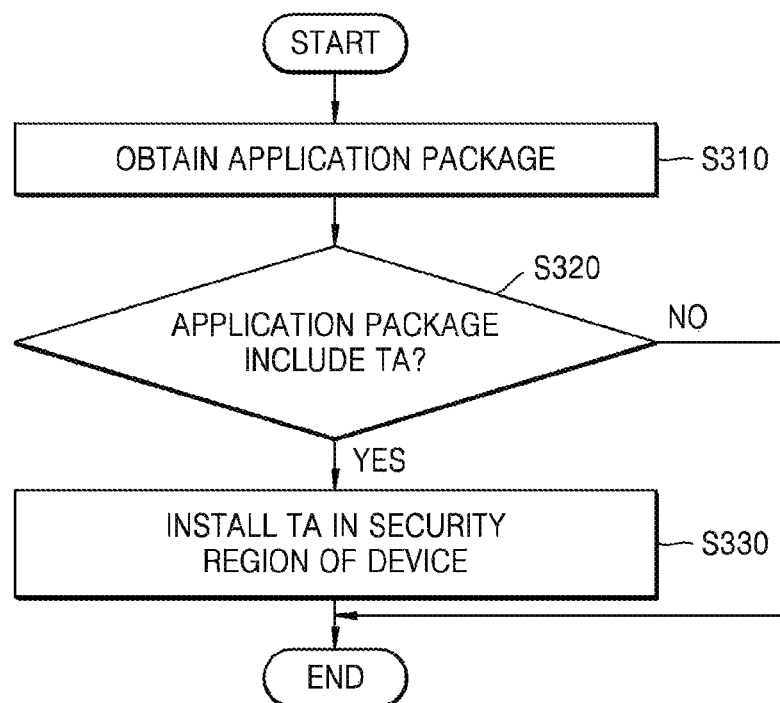
FIGS. 3 and 4 are flowcharts of a method of installing a TA, according to an embodiment.
Figure 4:
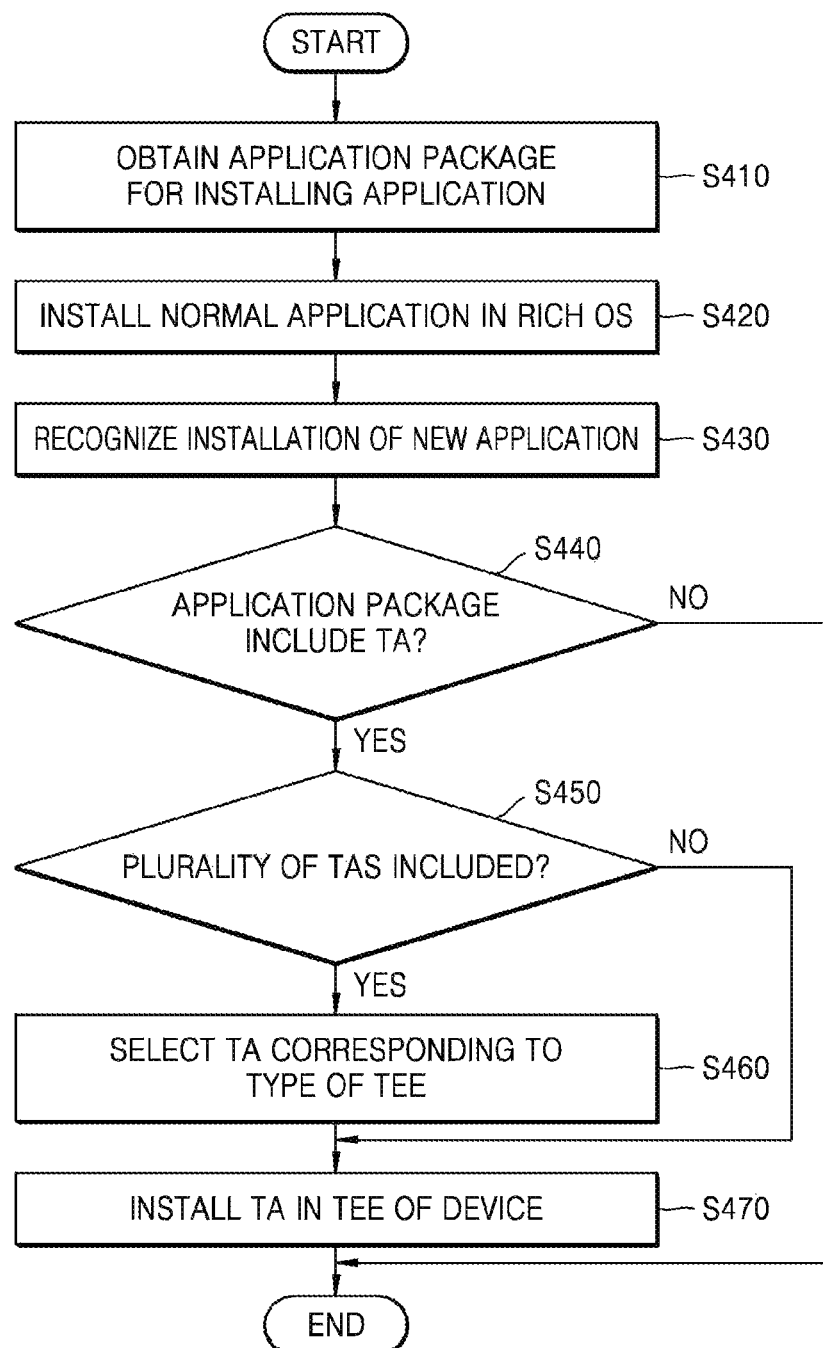

FIGS. 3 and 4 are flowcharts of a method of installing a TA according to an embodiment.

Referring to FIG. 3, in operation S310, the electronic device 100 obtains an application package for installing an application in the electronic device 100 through the network 120. According to an embodiment, the application package may include the normal application installed in the rich OS environment 101a.

In operation S320, the electronic device 100 determines whether the application package obtained in operation S310 includes a TA. For example, the electronic device 100 may determine whether the application package includes the TA based on a value of a flag indicating whether the TA is included. The flag may be included in the application package. According to an embodiment, regardless of whether the application package includes the TA, the electronic device 100 may install the normal application in the rich OS environment 101a by using the application package.

In operation S330, when the application package includes the TA, the electronic device 100 extracts the TA from the application package and installs the extracted TA in the electronic device 100. For example, the TA may be installed in a security region of the electronic device 100. The security region of the electronic device 100 may provide a high-security level environment to the TA. For example, the security region may include the TEE 101b. The TEE 101b provides the high-security level environment to the TA by strictly limiting an external access. The TA is installed in the security region, thus performing an operation of processing sensitive and critical data in the high-security level environment.

An embodiment for the method of installing a TA will be further described with reference to FIG. 4.

Referring to FIG. 4, in operation S410, the electronic device 100 obtains an application package for installing an application in the electronic device 100 through the network 120.

For example, the electronic device 100 may access an app store provided by the application distribution service device 110. The app store may provide, to the electronic device 100, at least one of information about an application installed in the electronic device 100 and information about a new application that may be installed in the electronic device 100. Once an application to be installed in the electronic device 100 is selected, the electronic device 100 downloads an application package for installing the selected application in the electronic device 100 through the app store.

In operation S420, the electronic device 100 installs the normal application in the rich OS environment 101a by using the application package.

In operation S430, when the normal application is installed in the rich OS environment 101a, the electronic device 100 recognizes installation of a new application in the rich OS environment 101a. For example, the electronic device 100 may use an event notification indicating installation of the new application, 'New App Installed' ("android-.intent.action.PACKAGE_ADDED"). 'New App Installed' ("android.intent.action.PACKAGE_ADDED") may be used for the electronic device 100 to recognize that the new application is installed. The event notification is merely an example, and a different type of the event notification may be used depending on a type of the OS used in the electronic device 100.

In operation S440, in response to the event notification indicating installation of the new application, the electronic device 100 determines whether an application package of the new application installed in the rich OS environment 101a includes a TA. For example, the electronic device 100 may determine whether the application package includes the TA based on a value of a flag indicating whether the application package includes the TA. In an embodiment, when the application package does not include the TA, installation of the TA is not needed, and thus installation of the application may be terminated.

In operation S450, when the application package includes the TA, the electronic device 100 determines whether a plurality of TAs are included in the application package. For example, the electronic device 100 may determine whether the plurality of TAs are included in the application package, based on identification information indicating the TA included in the application package.

The application package according to an embodiment may include a plurality of TAs that are installable in different types of the TEEs 101b or different types of the electronic devices 100. The different types of the TEEs may be different versions of the TEEs provided by different vendors or the same vendor. The electronic device 100 extracts a TA that may be installed in the TEE 101b of the electronic device 100 among the plurality of TAs from the application package. The electronic device 100 installs the extracted TA in the TEE 101b.

In operation S460, when the application package includes the plurality of TAs, the electronic device 100 selects a TA that may be installed in the TEE 101b from among the plurality of TAs. For example, the electronic device 100 may select a TA that may be installed and executed in the TEE 101b from among the plurality of TAs.

In an embodiment, when different types of TEEs 101b exist in the electronic device 100, the electronic device 100 may select a plurality of TAs that may be installed in the respective TEEs 101b.

In operation S470, the electronic device 100 extracts the TA selected in operation S460 from the application package, and installs the TA in the TEE 101b.

According to an embodiment, the TA may be installed after or before the normal application is installed in the rich OS environment 101a. In the rich OS environment 101a, the normal application and the TA may be installed in parallel.

However, when a system notification indicating installation of a new application when the new application is installed is activated, it may be desirable to install the TA after the normal application is installed in the rich OS environment 101a. This is because the electronic device 100 may install the TA after recognizing installation of the new application from the system notification.

Meanwhile, when one TA is included in the application package, the electronic device 100 installs the TA included in the application package in the TEE 101b. However, when the TA may not be installed in the TEE 101b, the TA installation service unit 105 terminates a process of installing the TA without installing the TA. For example, when the type of the TA is different from the type of the TEE 101b, the TA installation service unit 105 may terminate the process of installing the TA without installing the TA.

Figure 5:
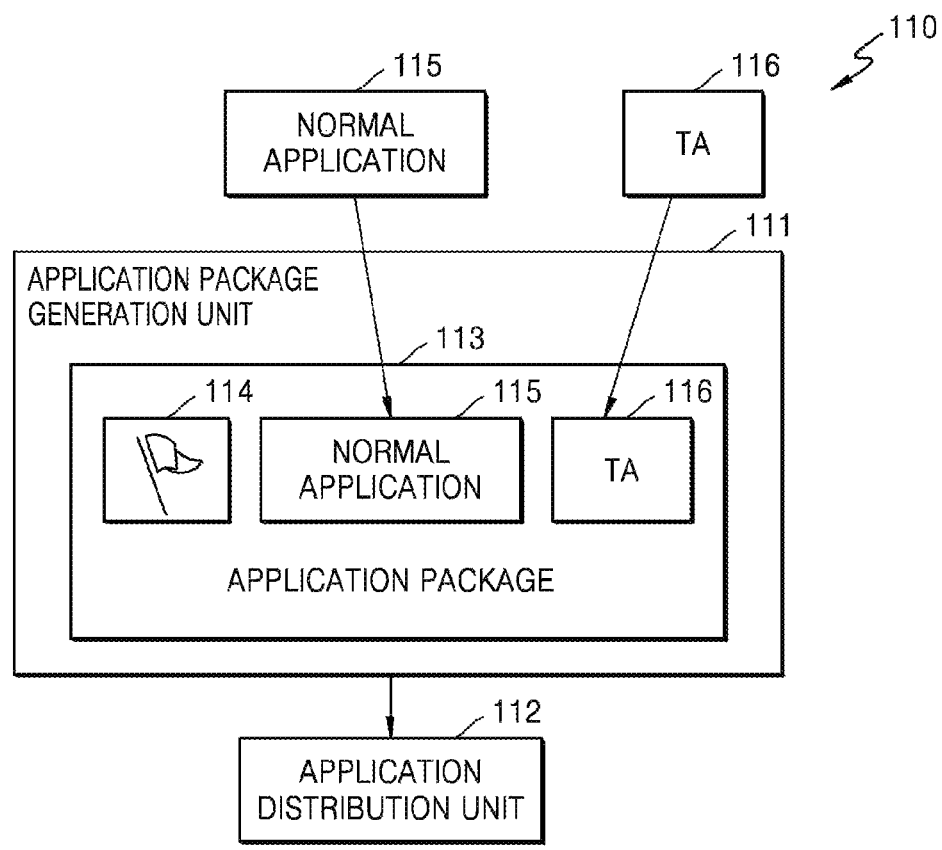
FIG. 5 is a block diagram of an apparatus for distributing a TA to an electronic device, according to an embodiment.

FIG. 5 is a block diagram of an apparatus for distributing a TA to the electronic device 100 according to an embodiment.

The apparatus shown in FIG. 5 may be included in the embodiment of the application distribution service device 110 shown in FIG. 1. The application distribution service device 110 may include an application package generation unit 111 for combining at least one of a flag 114, a normal application 115, and a TA 116 to generate an application package 113.

For example, the application package generation unit 111 may generate the application package 113 by using a software development kit based on a predetermined OS. The software development kit may be a set of development tools for producing an application program for a hardware platform, a computer system, an OS, etc. The application package generation unit 111 generates the application package 113 to be installed in the OS installed in the electronic device 100 by using the software development kit.

The application package generation unit 111 generates the application package 113 including a TA 116, and thus the TA 116 may be installed in the electronic device 100, together with a normal application 115. The application package generation unit 111 sets a state of a flag 114 for indicating whether the TA 116 is included in the application package 113. For example, the flag 114 may be set to 'TRUE' when the TA 116 is included, or to 'FALSE' when the TA 116 is not included.

For compatibility with a metadata structure of the application package 113, the flag 114 may be defined using custom android permission. The custom android permission is an option for setting authority needed when a predetermined activity is executed. Existence of the custom android permission may be checked by the electronic device 100. The custom android permission may be used to indicate existence or absence of the TA 116 in or from the application package 113. The custom android permission may be expressed by a sentence (e.g., "com.samsung.sec.TA_EXISTS"). The custom android permission may be stored in a manifest file including information related to the normal application. Without being limited to the above example, the flag 114 may be defined in the application package 113 in various ways. Information indicating whether the application package 113 includes the TA 116 may be included in the application package 113 in various forms of information, as well as in the flag 114.

The electronic device 100 determines whether the application package 113 includes the TA 116, by checking the state of the flag 114. The electronic device 100 executes a process for installing the TA 116 when the flag 114 is 'TRUE'.

An authentication token for managing a TEE is embedded in the application package 113. Thus, various management functions of the TA 116 (e.g., deletion and update of the TA 116 and update of a state of the TA 116) may be supported in the electronic device 100 by the authentication token. The authentication token is electronically signed binary data indicating an authenticated instruction generated by an authorized entity related to the TEE of the electronic device 100 or the TA 116, like a vendor or security domain owner of the TEE.

As described above, the flag 114 may signal existence or absence of the TA 116. Without being limited thereto, existence or absence of the TA 116 may be signaled by a package name attribute by including a signal, a suffix, which indicates existence or absence of the TA 116, e.g., ".TA PKG".

The application distribution service device 110 may include an application distribution unit 112 for transmitting the application package 113 to the electronic device 100. The application distribution unit 112 transmits the application package 113 generated by the application package generation unit 111 to the electronic device 100. The application distribution unit 112 transmits the application package 113 to the electronic device 100 at the request of the electronic device 100.

Figure 6:
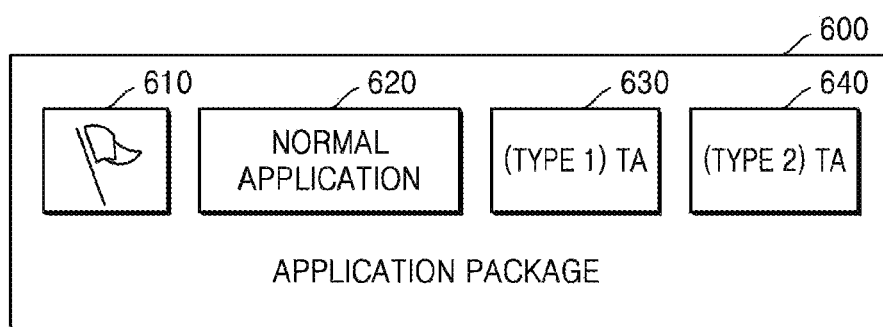
FIG. 6 is a block diagram of an application package including a plurality of different-type TAs, according to an embodiment.

FIG. 6 is a block diagram of an application package including a plurality of different-type TAs according to an embodiment.

Referring to FIG. 6, an application package 600 may include a flag 610, a normal application 620, and a plurality of TAs 630 and 640. The flag 610 may include information indicating whether the application package 600 includes a TA. The TAs 630 and 640 correspond to the TEE 101b of a type 1 and the TEE 101b of a type 2. Alternatively, the TAs 630 and 640 may correspond to the electronic devices 100 of a type 1 and a type 2.

An application developer provides the same application package 600 to different types of electronic devices 100. The different types of electronic devices 100 may include different types of TEEs 101b. The application package 600 may include the plurality of TAs 630 and 640 that may be installed in different types of TEEs 101b. Thus, one application package 600 may be provided to the electronic devices 100. In an embodiment, the electronic device 100 may extract the TA 630 or 640 matching the type of the electronic device 100 from the application package 600 and install the extracted TA 630 or 640 in the corresponding TEE 101b.

Figure 7:
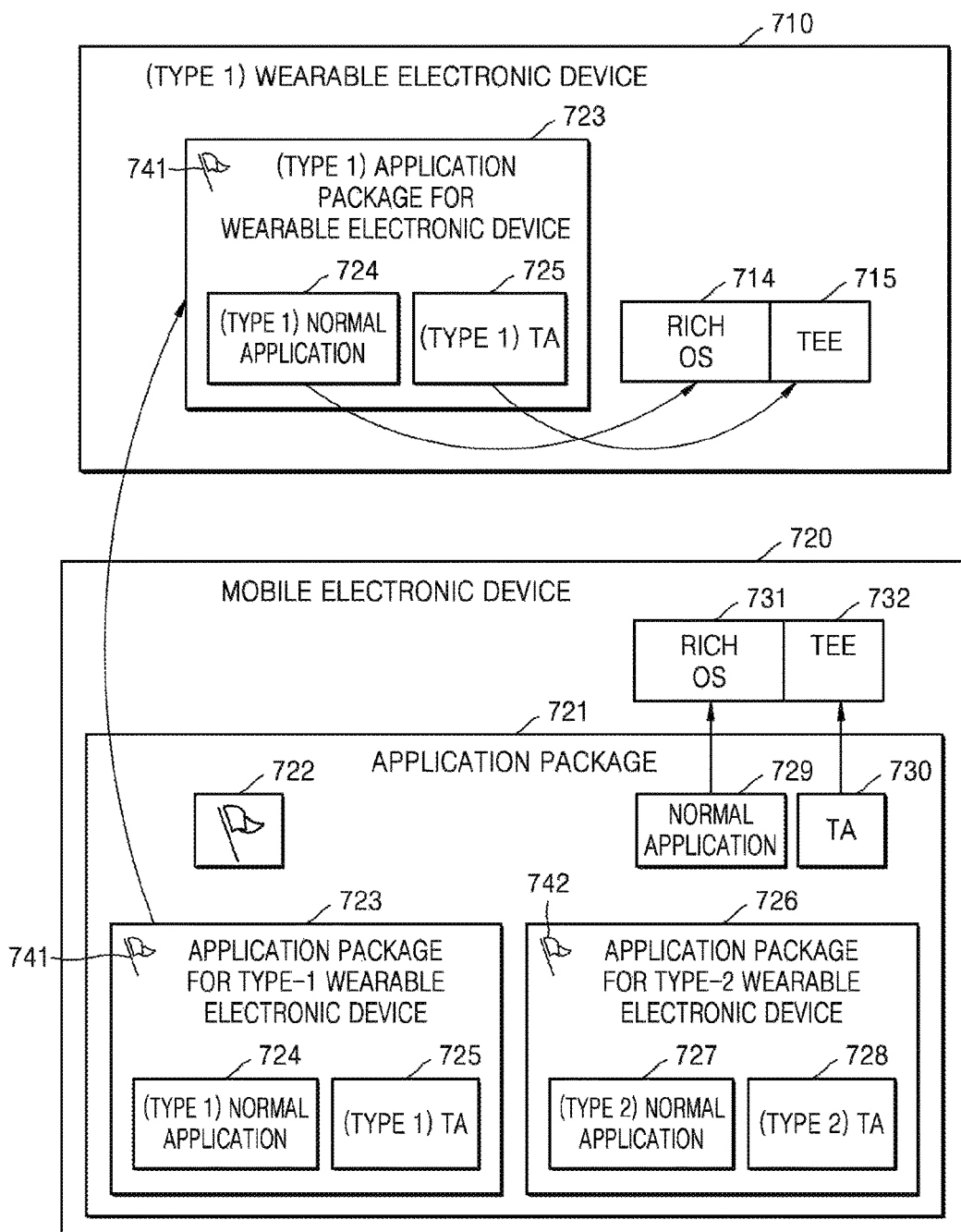
FIG. 7 is a block diagram of a system including paired electronic devices, according to an embodiment.

FIG. 7 is a block diagram of a system including paired electronic devices, according to an embodiment.

Referring to FIG. 7, a mobile electronic device 720 like a smartphone is paired with a wearable electronic device 710 like a smart watch. Without being limited to the wearable electronic device 710 and the mobile electronic device 720, various types of electronic devices may be paired with each other.

In the following description, a second application package may indicate an application package included in a first application package. A third application package may indicate an application package included in the second application package.

According to an embodiment, the first application package may be an application package that is directly connected with a network or that may be installed in an electronic device used as a main device. The second application package may be an application package that is connected to a network through another electronic device or that may be installed in an electronic device used as an auxiliary device. Electronic devices in which the first application package and the second application package may be installed, respectively, may be connected or paired with each other in a wired or wireless manner. The second application package may be installed in an electronic device of a type that may be connected or paired with an electronic device of a type in which the first application package may be installed.

Second application packages 723 and 726 may be included in a first application package 721, and may include another application package, e.g., a third application package. The second application package 723 is installed in the wearable electronic device 710 of a type 1 paired with the mobile electronic device 720. The second application package may include at least one of a normal application 724 and a TA 725 that may be installed in the wearable electronic device 710.

The third application package that may be included in the second application packages 723 and 726 may be installed in an electronic device of a type that may be paired or connected with a type of an electronic device where the second application packages 723 and 726 may be installed. The application package may include application packages that may be recursively installed in another electronic device as in the above-described embodiment.

The mobile electronic device 720 extracts a normal application 729 and a TA 730 from the first application package 721 and installs the normal application 729 and the TA 730 in the rich OS environment 731 and the TEE 732, respectively. The mobile electronic device 720 determines whether the TA 730 exists in the first application package 721 based on a flag 722, and installs the TA 730 in the mobile electronic device 720.

The first application package 721 may further include the second application package 723 for the type-1 wearable electronic device 710 and the second application package 726 for the type-2 wearable electronic device. Wearable electronic devices of different types may include different OSs or different TEEs. The second application package 723 for the type-1 wearable electronic device and the second application package 726 for the type-2 wearable electronic device may include at least one of the normal applications 724 and 727 that are installable in different OSs and TAs 725 and 728 that are installable in different TEEs, respectively. For example, the first application package 721 obtained by the mobile electronic device 720 may include an Android package for an Android Wear smart watch or a widget for a Samsung Gear smart watch, as the second application package.

Each of the second application packages 723 and 726 may further include flags 741 and 742 indicating whether the TAs 725 and 728 are included. The electronic device where the second application packages 723 and 726 are installed may determine by using the flags 741 and 742 whether the TAs 725 and 728 exist.

The mobile electronic device 720 extracts the second application package 723 that are installable in the type-1 wearable electronic device 710 from the first application package 721. The mobile electronic device 720 extracts the second application package 723 to the type-1 wearable electronic device 710. As shown in FIG. 7, the TA 725 of the type 1 included in the second application package 723 may be installed in the TEE 715 of the type-1 wearable electronic device 710. The second application package 723 may further include the normal application 724 of the type 1 to be installed in the rich OS environment 714 of the wearable electronic device 710. The second application package 723 according to an embodiment may include at least one of the type-1 normal application 724 and the type-1 TA 725 that are installable in the type-1 wearable electronic device 710.

At least one of the normal application 724 and the TA 725 included in the second application package 723 may be related to the normal application 729 or the TA 730 installed in the mobile electronic device 720. For example, the second application package 723 may include at least one of the type-1 normal application 724 and the type-1 TA 725 that are executable in connection with the normal application 729 installed in the mobile electronic device 720.

Figure 8:
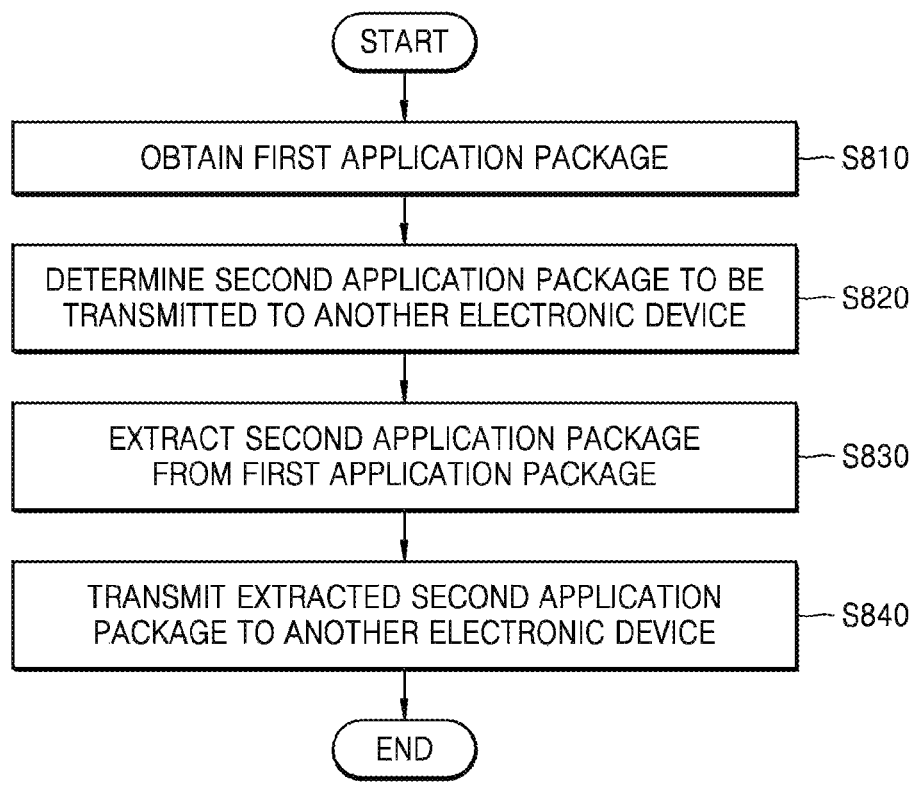
FIG. 8 is a flowchart of a method of transmitting a TA to an electronic device paired with another electronic device, according to an embodiment.

FIG. 8 is a flowchart of a method of transmitting a TA to an electronic device paired with another electronic device, according to an embodiment.

Referring to FIG. 8, in operation S810, an electronic device obtains a first application package. The electronic device and another electronic device may be paired or wiredly or wirelessly connected with each other.

In operation S820, the electronic device determines a second application package to be transmitted to the other electronic device from among one or more second application packages included in the first application package. The second application package may be determined according to whether an application of the second application package is installable in the other electronic device.

In the other electronic device having received the second application package, at least one of a normal application and a TA that are included in the second application package may be installed. The other electronic device installs the TA based on a flag included in the second application package.

According to an embodiment, the first application package for the mobile electronic device may include one or more second application packages for different types of wearable electronic devices. When the wearable electronic device of a particular type is paired with the mobile electronic device, a second application package that is installable in the paired wearable electronic device may be selected. The second application package may be transmitted to the paired wearable electronic device.

In operation S830, the electronic device extracts, from the first application package, the second application package that is to be transmitted to the other electronic device and is determined in operation S820.

In operation S840, the extracted second application package is transmitted to the other electronic device. The second application package may include at least one of the normal application that is installable in the rich OS environment and the TA that is installable in the TEE. The second application package may further include a flag indicating whether the TA is included. In another example, instead of being included in the second application package, the TA may be extracted by the electronic device and transmitted to the paired other electronic device.

The second application package transmitted to the paired other electronic device may include one or more third application packages. The paired other electronic device extracts the third application package from the second application package, and transmits the third application package to the electronic device in which an application of the third application package is to be installed. The electronic device in which the third application package is to be installed may be another electronic device that is paired with the electronic device where the application of the second application package is installed.

Figure 9:
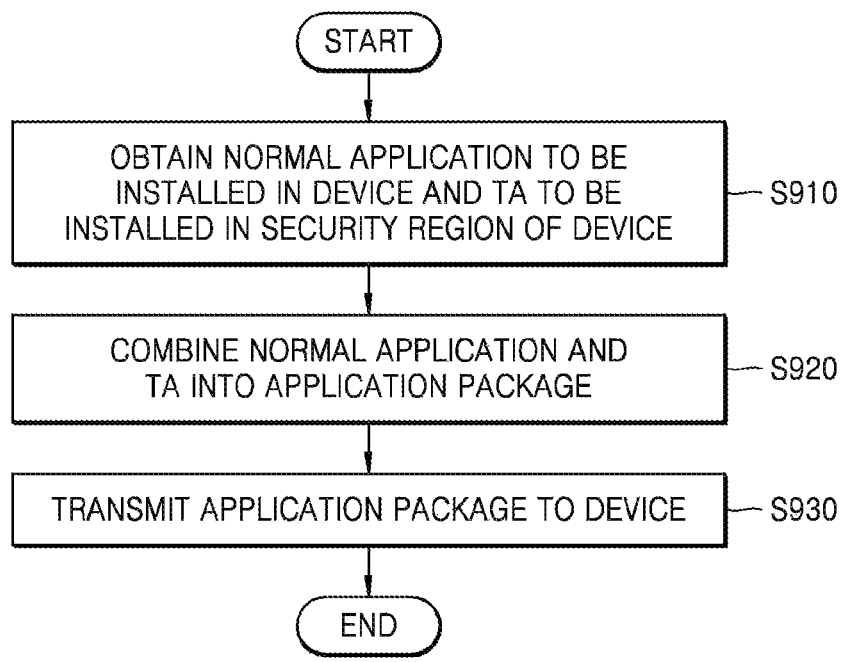
FIG. 9 is a flowchart of a method of distributing an application package including a TA, according to an embodiment.

FIG. 9 is a flowchart of a method of distributing an application package including a TA, according to an embodiment.

Referring to FIG. 9, in operation S910, an application distribution device obtains a normal application to be installed in an electronic device and a TA to be installed in a security region of the electronic device.

In operation S920, the application distribution device combines the normal application and the TA into an application package. The application package may further include a flag indicating whether the TA is included. The application package may include a plurality of TAs corresponding to types of the plurality of TAs.

In operation S930, the application distribution device transmits the application package to an electronic device where an application is to be installed. The application distribution device may transmit the application package to the electronic device at the request of the electronic device.

Figure 10:
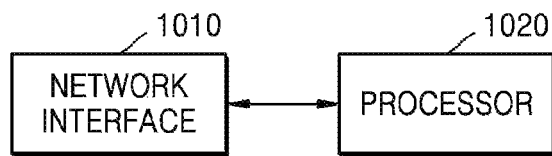
FIG. 10 is a block diagram of an electronic device in which an application is installed, according to an embodiment.

FIG. 10 is a block diagram of an electronic device in which an application is installed, according to an embodiment.

Referring to FIG. 10, an electronic 1000 may include a network interface 1010 and a processor 1020.

The network interface 1010 obtains an application package for installing an application through an external network. The application package is provided to the electronic device 1000 through an app store that provides application packages installable in the electronic device 1000.

The processor 1020 extracts a TA from the application package obtained through the network interface 1010, and installs the TA in a security region of the electronic device 1000. In an embodiment, the security region of the electronic device 1000 may include a TEE an external access to which is limited. The TA may perform a task by using sensitive and critical data. The TA may perform a task at a high security level by being executed in the TEE.

According to an embodiment, without a need for a server-based system for distributing a TA to one or more electronic devices, the TA may be distributed to the one or more electronic devices by using an application package.

Meanwhile, the foregoing embodiment may be written as a program executable on computers, and may be implemented on a general-purpose digital computer operating the program by using a computer-readable recording medium. In addition, a structure of data used in the foregoing embodiment may be recorded on a computer-readable recording medium using various means. Moreover, the foregoing embodiment may be implemented as a recording medium, e.g., such as a computer-executable programming module, which includes a computer-executable instruction. For example, methods implemented with a software module or algorithm may be stored in a computer-readable recording medium as codes or program instructions that are readable and executable by computers.

The computer-readable recording medium may be an available medium that is accessible by a computer, and includes all of a volatile medium, a non-volatile medium, a separated medium, and a non-separated medium. The computer-readable recording medium may include, but not limited to, a storage medium, for example, a magnetic storage medium such as a read-only memory (ROM), a floppy disk, a hard disk, etc., an optical reading medium such as a compact-disc (CD)-ROM, a digital versatile disc (DVD), etc. The computer-readable recording medium may also include both a computer storage medium and a communication medium.

Moreover, a plurality of computer-readable recording media may be distributed over network-connected computer systems, and data, for example, program instructions and codes, stored in the distributed recording media, may be executed by at least one computer.

The particular implementations described in the present disclosure are illustrative examples and are not intended to otherwise limit the scope of the present disclosure in any way. For the sake of brevity, conventional electronics, control systems, software development and other functional aspects of the systems may not be described in detail.

The term used in the embodiments such as "unit" or "module" indicates a unit for processing at least one function or operation, and may be implemented in hardware, software, or in a combination of hardware and software.

The term "unit" or "module" may be implemented by a program that is stored in an addressable storage medium and executable by a processor.

For example, the term "unit" or "module" may include software components, object-oriented software components, class components and task components, processes, functions, attributes, procedures, subroutines, segments of a program code, drivers, firmware, microcode, circuitry, data, databases, data structures, tables, arrays, and variables.

The invention claimed is:

1. A method of installing an application in an electronic device, the method comprising:
obtaining a first application package for installing the application, the first application package including a flag,
a normal application and a plurality of trusted applications (TAs), the flag indicating whether the first application package includes a trusted application (TA);
identifying whether the first application package comprises a first TA that is installable in the electronic device based on the flag included in the first application package;
installing the first TA in the electronic device when the first application package comprises the first TA;
identifying whether the first application package comprises a second TA that is installable in another electronic device based on the flag included in the first application package; and
transmitting the second TA to the other electronic device when the first application package comprises the second TA that is installable in the other electronic device,
wherein the identifying whether the first application package comprises the first TA comprises:
obtaining the flag from the first application package, the flag indicating whether the first TA is included; and
identifying, based on the obtained flag, whether the first application package comprises the first TA that is installable in the electronic device.

2. The method of claim 1, further comprising:
extracting, from the first application package, a second application package that is installable in the other electronic device; and
transmitting the extracted second application package to the other electronic device.

3. The method of claim 1, wherein the other electronic device comprises a wearable electronic device that is paired with the electronic device.

4. The method of claim 1, wherein the installing of the first TA comprises:
selecting, among the plurality of TAs, a trusted application that is installable in a security region of the electronic device, based on a type of the electronic device the plurality of TAs corresponding to different types of security regions; and installing the selected TA in the security region of the electronic device.

5. An electronic device in which an application is to be installed, the electronic device comprising:
   a network interface configured to obtain a first application package for installing the application, the first application package including a flag, a normal application and a plurality of trusted applications (TAs), the flag indicating whether the first application package includes a trusted application (TA); and
   at least one processor configured to identify whether the first application package comprises a first TA that is installable in the electronic device based on the flag included in the first application package and to install the first TA in the electronic device when the first application package comprises the first TA,
   wherein the at least one processor is further configured to:
   identify whether the first application package comprises a second TA that is installable in another electronic device; and
   control the network interface to transmit the second TA to the other electronic device when the first application package comprises the second TA that is installable in the other electronic device, and
   wherein the at least one processor is further configured to obtain the flag from the first application package, the flag indicating whether the first TA is included, and to identify, based on the obtained flag, whether the first application package comprises the first TA that is installable in the electronic device.

6. The electronic device of claim 5, wherein the at least one processor is further configured to:
   extract, from the first application package, a second application package that is installable in the other electronic device; and
   control the network interface to transmit the extracted second application package to the other electronic device.

7. The electronic device of claim 5, wherein the other electronic device comprises a wearable electronic device that is paired with the electronic device.

8. The electronic device of claim 5, wherein the at least one processor is further configured to select, among the plurality of TAs, a trusted application that is installable in a security region of the electronic device based on a type of the electronic device, the plurality of TAs corresponding to different types of security regions, and to install the selected TA in the security region of the electronic device.

9. A method of distributing an application to an electronic device, the method comprising:
   obtaining a normal application to be installed in the electronic device and a plurality of trusted applications (TAs), wherein the plurality of TAs include a first TA to be installed in a security region of the electronic device and a second TA to be installed in another electronic device;
   combining the normal application and the plurality of TAs into an application package;
   setting a flag indicating whether the application package includes a TA in the application package; and
   transmitting the application package including the flag, the normal application and the plurality of TAs to the electronic device,
   wherein the method further comprises identifying whether the application package includes the TA based on the flag in the application package, and
   wherein the identifying comprises obtaining the flag from the application package, the flag indicating whether the TA is included, and
   identifying, based on the obtained flag, whether the application package comprises the TA that is installable in the electronic device.

* * * * *